D. NOBLE.
FRICTION CLUTCH.
APPLICATION FILED JUNE 15, 1909.
950,053.
Patented Feb. 22, 1910.
2 SHEETS—SHEET 1.
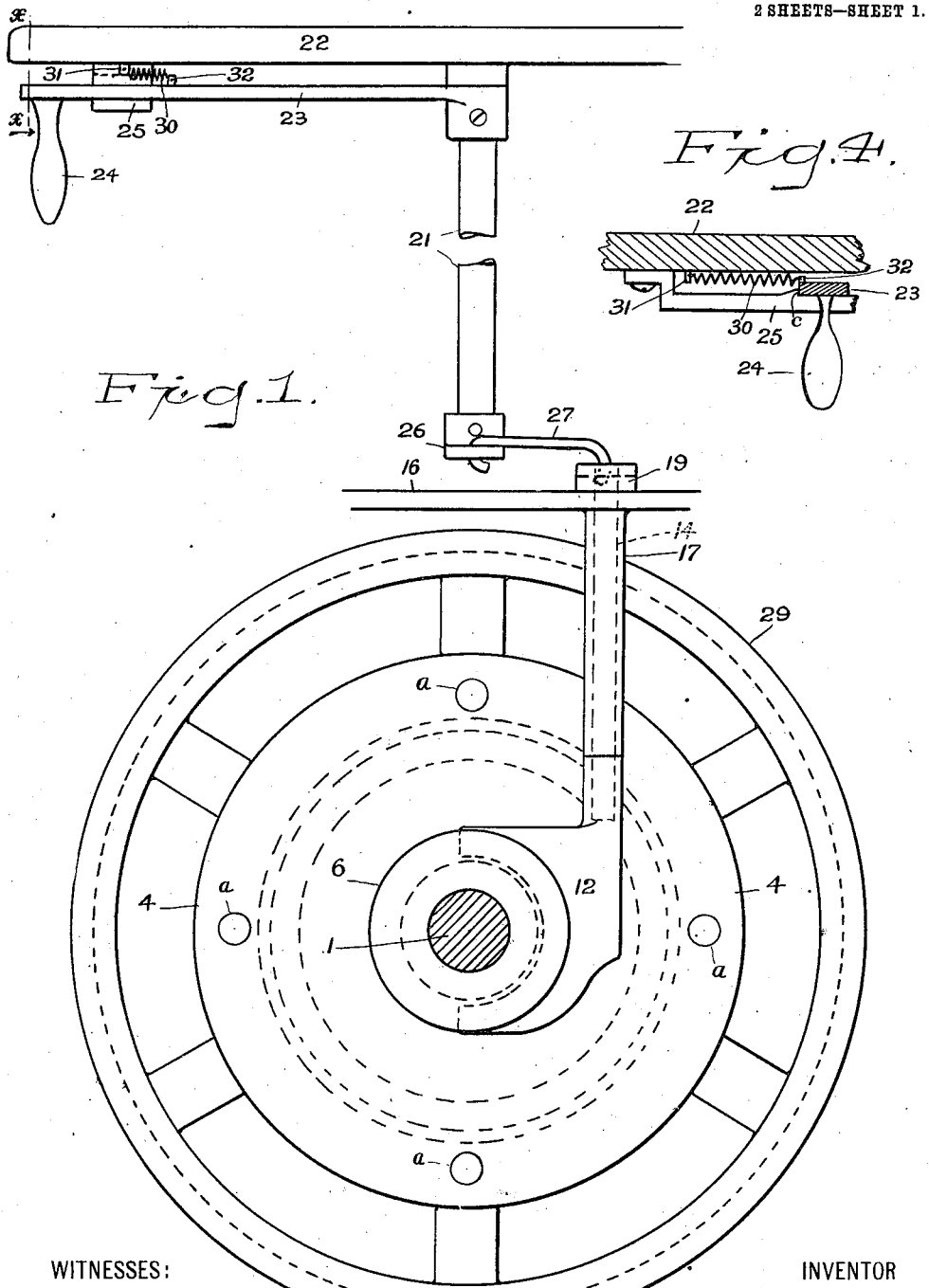
WITNESSES:
H. C. A. Lamb
M. I. Lougher
INVENTOR
Donald Noble
BY
ATTORNEY

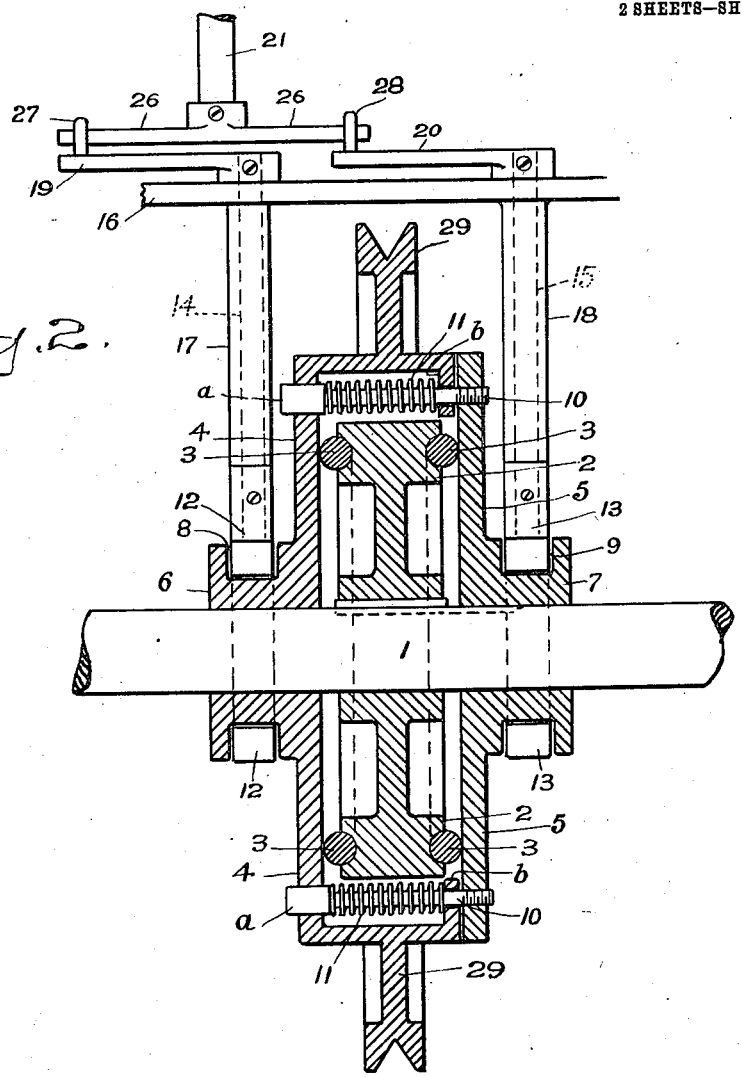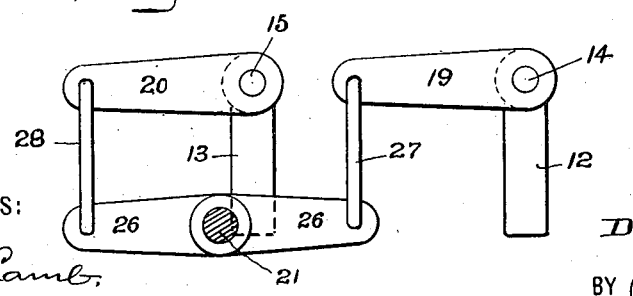

UNITED STATES PATENT OFFICE.

DONALD NOBLE, OF BRIDGEPORT, CONNECTICUT.

FRICTION-CLUTCH.

950,053.   Specification of Letters Patent.   Patented Feb. 22, 1910.

Application filed June 15, 1909. Serial No. 502,242.

*To all whom it may concern:*

Be it known that I, DONALD NOBLE, a subject of Edward VII, King of Great Britain, residing at Bridgeport, in the county of Fairfield and State of Connecticut, United States of America, have invented certain new and useful Improvements in Friction-Clutches; and I do hereby declare the following to be a full, clear, and exact description of the invention, such as will enable others skilled in the art to which it appertains to make and use the same.

My invention relates to friction clutches for machines of various descriptions, but more particularly to be used in connection with machines for covering or insulating wire with yarn or its equivalent.

The object of my invention is to provide a friction clutch which shall cause no shock whatsoever in stopping or starting a machine, thereby peculiarly adapting my improvement for use in connection with machines for covering wire with fine yarn, since the latter as well as the wire itself possess no great degree of tensile strength and any accidental breakage is very annoying.

My invention consists in the details of construction and arrangement of parts hereinafter fully described and then particularly pointed out in the claims which conclude this description.

In the accompanying drawing which forms a part of this application Figure 1 is an elevation of my improvement—Fig. 2 a sectional elevation thereof—Fig. 3 a detail plan view showing the rock bar and the manner in which the same is connected with the yokes that operate the clutch mechanism, and Fig. 4 is a detail section at the line *x, x,* of Fig. 1.

Similar characters of reference denote like parts in the several figures of the drawing.

I have illustrated no specific machine in connection with my improvement, since this is not deemed necessary owing to the fact that the character of the machine is not of the essence of my invention.

In U. S. Letters Patent No. 611,512, issued September 27, 1898, to T. R. Rossiter and myself, a friction clutch is shown and described in which there are two rotary clutch elements only one of which has a movement lengthwise of the supporting shaft, and interposed between the clutch elements is a leather disk that is carried by the power pulley which latter is loosely mounted on its supporting shaft, and the movable clutch element is operated to force the leather disk firmly against the other clutch element, which is the belt pulley, whereby motion is transmitted to the machine to be driven. This style of clutch is likewise shown in U. S. Patents No. 656,853, dated August 28, 1900, and No. 680,665, dated August 13, 1901, both which were issued to me. In the clutch shown in these patents, the leather disk is likely to stick to the clutch after its elements are disengaged thereby requiring some sort of brake device to insure the prompt stopping of the rotary motion of the clutch.

In my present improvement the power pulley is tight on the power shaft and the clutch elements entirely inclose this pulley and are both movable lengthwise of the shaft and engage with frictional rings carried by the opposite sides of such pulley, so that there can be no sticking or hanging of the clutch elements to the friction rings when said elements are withdrawn from the power pulley, and accordingly I do away entirely with any necessity for a special brake acting against the clutch. Moreover, my improved clutch elements, since they entirely inclose the power pulley, form a dust proof box and thus keep the parts clean and free of all foreign matter.

1 is the power shaft and 2 the power pulley splined thereon. Within the opposite side faces of this pulley are secured rings 3, of any suitable material that possesses good frictional contact such as rubber, leather, &c., which rings are concentric with the pulley itself. Loosely supported around the shaft 1 and inclosing the pulley 2 is a clutch box 4, and also supported loosely around said shaft is a disk 5 which constitutes one side of the clutch box. Both the box and disk are provided with hubs 6, 7, respectively, through which the shaft 1 extends, and these hubs are each formed with annular grooves 8, 9, for the purpose presently to be explained.

10 are pins secured to the disk 5 and extending within the box 4, and *a* are heads on the free extremities of these pins projecting loosely through the side of said box. *b* are ears which project inwardly from the box 4 adjacent to the disk 5 through which ears the pins 10 pass freely, and 11 are coil springs around the pins and confined at their ends by the heads *a* and ears *b*, so that it will be clear that when said disk and box are separated said springs will be compressed.

12, 13, are yokes which extend within the grooves 8, 9, respectively, and 14, 15, are vertically disposed rods whose lower extremities are secured to the yokes 12, 13.

16 is a part of the frame work in which the power shaft is journaled, and 17, 18, are tubular casings rigidly secured to this frame work and depending therefrom, through which casings the rods 14, 15, extend, and to the upper extremities of these rods, immediately above the framework 16, are secured crank arms 19, 20.

21 is a rock shaft which depends immediately below the bed 22 of the machine in connection with which my improvement is to be used, and this rock shaft is secured to the bed in any suitable manner so as to be capable of axial rocking movements.

23 is a lever secured to the rock shaft 21 and provided at its outer end with a handle 24, so that it will be clear that by shifting this lever to and fro the shaft 21 will be rocked.

25 is any ordinary bracket or strap which depends from the bed 2 and acts as a support for the lever 23, and is provided with a notch *c*, for the purpose presently to be explained.

To the lower extremity of the rock shaft 21 is secured a rock bar 26, and the outer extremities of this bar are secured to the outer extremities of the cranks 19, 20, by means of links 27, 28.

29 is a belt wheel external of the clutch box 4 and rigid with the periphery thereof which belt wheel is the means whereby motion is transmitted to the machine by means of any suitable belt.

30 is a coil spring whose ends are secured to pins 31, 32, projecting respectively from the bed 22 and lever 23, the function of which spring is to return said lever to normal position when it is released from the notch *c*.

The operation of my improvement is as follows:—When the parts are in the position shown at Fig. 2, the rings 3 will be in close frictional contact with the inner walls of the clutch box and disk and therefore rotary motion will be communicated to said box and disk, and the belt wheel 29 will thereby be revolved to transmit power to the machine in connection with which my improvement is used. The spring 30 is stronger than the springs 11, and when the lever 23 is released from the notch *c* this spring 30 will return the lever to normal position and thereby rock the shaft 21, and the rods 14, 15 will be rocked through the medium of the links 27, 28, and the cranks 19, 20, whereby the yokes 12, 13, will be turned in opposite directions, thereby separating the box and disk and withdrawing the inner side walls of the same from contact with the rings 3, and since the clutch box and disk and parts carried thereby are loose around the power shaft, it follows that, when said box and disk are separated in the manner just described, the power pulley will continue to revolve while the belt wheel 29 will come to a state of rest.

In applying the power to the belt wheel 29, the lever 23 is swung in the reverse direction and engaged with the notch *c*, whereupon the springs 11 will by their resiliency bring the inner side walls of the box in contact with the rings 3, and it will be clear that the operations of this friction clutch will be effected without the slightest jar or shock, thereby peculiarly adapting my improvement for use in connection with covering or insulating wire with yarn or other suitable material.

Of course the spring 30 may be omitted, if desired, and the lever swung manually to normal position, but I prefer to employ this spring since it renders the action of the lever automatic in effecting the releasing of the clutch.

Having thus described my invention what I claim as new and desire to secure by Letters Patent is:—

1. A friction clutch, consisting of a power shaft, a power pulley tight thereon and carrying friction contact surfaces on its opposite sides, clutch elements in rotary connection loosely supported on said shaft and inclosing said pulley and capable each of lengthwise movements along said shaft toward and away from said friction contact surfaces, said clutch elements having concentric annularly grooved external hubs, spring elements for constantly pressing the clutch elements against said friction contact surfaces, yokes extending within the grooves of said hubs, rods secured to said yokes, crank arms secured to said rods, a rock shaft carrying a rock bar, links which connect the ends of said rock bar with the ends of said crank arms, and means for operating said rock shaft.

2. A friction clutch, comprising a power shaft, a power pulley tight thereon, friction rings secured to the opposite side faces of said pulley, a clutch box loose on said shaft and inclosing said pulley and having at its open side inwardly extending ears, a clutch disk also loose on said shaft and forming a cover to said box, pins secured to said disk and extending loosely through said ears and provided with heads which pass freely into the side of said box, coil springs around said pins and bearing against said ears and heads whereby said box and disk are normally engaged with said rings, and mechanism for withdrawing said box and disk from contact with said rings.

3. A friction clutch, consisting of a power shaft, a power pulley tight thereon, friction contact surfaces carried by opposite sides of said pulley, clutch elements comprising a box having at its open side inwardly extending ears and a disk which forms a cover to said box, said box and disk loosely supported on said shaft and inclosing said pulley and capable of movements lengthwise of said shaft toward and away from said friction contact surfaces and having concentric annularly grooved external hubs, pins carried by said disk and extending loosely through said ears and having at their free ends heads which pass freely into the side of said box whereby said box and disk are in rotary connection, coil springs around said pins and bearing against said heads and ears whereby said box and disk are normally engaged with said friction contact surfaces, yokes extending within the grooves of said hubs, rods secured to said yokes, crank arms secured to said rods, a rock shaft carrying a rock bar, links which connect the ends of said rock bar with the ends of said crank arms, and means for operating said rock shaft.

In testimony whereof I affix my signature in presence of two witnesses.

DONALD NOBLE.

Witnesses:
ABBIE M. DONIHU,
CHARLES E. BERGER.